(12) United States Patent
Le Meur et al.

(10) Patent No.: US 7,379,604 B2
(45) Date of Patent: May 27, 2008

(54) DEVICE AND PROCESS FOR CODING VIDEO IMAGES BY MOTION COMPENSATION

(75) Inventors: Olivier Le Meur, Rennes (FR); Patrice Alexandre, Cesson Sévigné (FR); Ludovic Noblet, Heric (FR)

(73) Assignee: Nextream France, Cergy Saint Christophe (FR)

( * ) Notice: Subject to any disclaimer, the term of this patent is extended or adjusted under 35 U.S.C. 154(b) by 646 days.

(21) Appl. No.: 10/488,920

(22) PCT Filed: Aug. 22, 2002

(86) PCT No.: PCT/EP02/09477

§ 371 (c)(1),
(2), (4) Date: Sep. 23, 2004

(87) PCT Pub. No.: WO01/93593

PCT Pub. Date: Dec. 6, 2001

(65) Prior Publication Data

US 2005/0031211 A1    Feb. 10, 2005

(30) Foreign Application Priority Data

Sep. 6, 2001    (FR) ................... 01 11655

(51) Int. Cl.
*G06K 9/36* (2006.01)
*H04B 1/66* (2006.01)

(52) U.S. Cl. ...................... 382/232; 375/240

(58) Field of Classification Search ........ 382/232–253; 375/240–240.29
See application file for complete search history.

(56) References Cited

U.S. PATENT DOCUMENTS

| 5,640,208 A | 6/1997 | Fujinami ................ 348/413 |
| 6,122,314 A | 9/2000 | Bruls et al. ............. 375/240 |
| 6,944,230 B2* | 9/2005 | Babonneau et al. ... 375/240.29 |

FOREIGN PATENT DOCUMENTS

| EP | 1037473 | 9/2000 |
| WO | 01/93593 | 12/2001 |

OTHER PUBLICATIONS

Search report dated Nov. 25, 2002.

* cited by examiner

*Primary Examiner*—Aaron W Carter
(74) *Attorney, Agent, or Firm*—Joseph J. Laks; Paul P. Kiel; Guy H. Eriksen

(57) ABSTRACT

A device and a method for coding video images by motion compensation. The device incorporates a coding unit and a filtering unit. A calculation unit for calculating a recursivity coefficient as a function of an estimated noise level and a prediction error, a measurement unit for measuring the intra-image correlation and the inter-image correlation, a selection unit for selecting a type of coding applied to the current input image as a function at least of the measurements of the inter-image correlation and of the measurements of the intra-image correlation and as a function of the estimated noise level, a coding unit for coding the current input image as a function of the type of coding selected.

9 Claims, 5 Drawing Sheets

DEVICE AND PROCESS FOR CODING VIDEO IMAGES BY MOTION COMPENSATION

This application claims the benefit, under 35 U.S.C. § 365 of International Application PCT/EP02/09477, filed Aug. 22, 2002, which was published in accordance with PCT Article 21(2) on Mar. 20, 2003 in English and which claims the benefit of French patent application No. 0111655, filed Sep. 6, 2001.

FIELD OF THE INVENTION

The invention relates to a process and a device for coding video images by motion compensation.

BACKGROUND OF THE INVENTION

Coding by motion compensation offers considerable possibilities of bit rate reduction in moving images, which exhibit high temporal coherence.

The acquisition of video image sequences is still today largely carried out in analogue form so that the images, once acquired and possibly transmitted and then stored in analogue formats, exhibit an appreciable share of noise in their content. Once digitised, these images are also often subjected to storage/editing operations which, in their turn, introduce noise, this time of a digital nature. Finally, an image sequence generally undergoes a succession of transformations, the result of which is characterized by spatio-temporal noise of a highly random nature. The effect of this noise on the coding processes based on motion compensation is highly penalizing in terms of coding efficiency in so far as the random nature of the noise renders any motion compensation ineffective.

The noise therefore represents a sizeable share of the bit rate of the binary stream after coding. This component exhibiting no useful information, it is generally desirable to attenuate it by filtering processes whose role is to eliminate the random spatio-temporal components in the image sequence.

Among the noise reduction techniques, one of the most appropriate techniques consists in recursively averaging the images of the sequence. For the static shots/objects of a sequence, the averaging makes it possible to attenuate the noise-specific random component while preserving, with a certain degree of faithfulness, the original shots/objects. For the moving shots/objects, the problem is trickier in so far as a temporal averaging introduces an unacceptable remanence effect (or trail effect). It is then necessary to choose between two strategies: leave the moving shots/objects intact (hence leave the noise) or else use motion compensation so as to "follow" the shots/objects in their motion and filter in the direction of the motion. The first strategy makes it possible to achieve motion-adapted (that is to say, adapted to the presence of motion) recursive filtering, the second strategy, intuitively more powerful, carries out motion-compensated recursive filtering.

To decrease the effects of noise in systems for coding images by motion compensation, known solutions consist in placing a filtering module upstream of the coding process. However, this solution constitutes a significant extra cost for the system.

In order to reduce the costs of such a system, one solution consists in incorporating the recursive filtering and coding processes rather than in cascading them.

In this approach, the coder-specific motion compensating architecture is exploited in order to carry out, in a single pass, motion-compensated recursive filtering. This leads to an architecture whose performance/set-up cost ratio exceeds, for certain coding configurations, that of the traditional solutions.

The principle of noise reduction by recursive filter relies on the absence of spatio-temporal coherence of the noise with respect to the useful signal. Therefore it is directed only at noise of a random nature such as that encountered in certain analogue transmission/storage media and, to a lesser extent that engendered by certain digital coding processes such as quantization. The information contained in the useful signal being characterized by its level of spatio-temporal coherence (superposition of moving shots/objects), the removal of noise is achieved by temporal averaging of the shots/objects contained in the sequence. To carry out this averaging, it is necessary to detect the various shots/objects of the sequence so as to characterize the nature of the motion over these shots/objects.

Various modes of implementation of the motion estimation function make it possible to achieve prediction. Certain modes use a "pixel-wise" motion estimation function, this signifying that a new displacement vector is calculated for each pixel. Other modes of implementation utilize the "block-wise" motion estimation solutions, this signifying that the same motion vector is used for the set of pixels which constitute the block (a block consisting of a matrix of contiguous pixels in the image). It is obvious that the modes based on "block wise" motion compensation may potentially exhibit limitations in performance when there is sizeable deformation of the shots/objects in motion. In this case, this results in a sizeable prediction error, which in turn gives rise to an attenuation of the effect of the recursive filter.

U.S. Pat. No. 6,122,314 discloses the principle of recursive filtering which consists in weighting the error signal of a coder employing motion compensation and differential coding.

However, this patent describes a process whose performance is not maximal in particular when the error signal is composed essentially of a high-energy noise component.

SUMMARY OF THE INVENTION

The present invention relates to a device for coding by motion compensation based on adaptive management of the type of images to be coded and of estimation of the noise level with the aim of jointly improving the performance of the coding and of the recursive filtering, which makes it possible to obtain good image quality, while considerably reducing the negative effects set forth hereinabove.

Accordingly, the invention proposes a device for coding video images by motion compensation comprising a coder comprising:
- means of storage of at least one input image,
- motion estimation means, designed to produce motion vectors (D(dx, dy)) and quantities representative of motion-compensated image variations (DFD), on the basis of a current input image and of at least the said input image stored previously in the said means of storage,
- means of calculation of a motion-compensated image on the basis of a filtered image and of the said motion vectors (D(dx, dy)),
- means of calculation of a prediction error ($\epsilon$), between the said current input image and the said filtered image predicted by motion compensation, means of calculation of a recursivity coefficient ($\alpha$), first means of filtering, intended to produce a weighting of the said prediction error by a modified recursivity coefficient ($1-\alpha$), second means of filtering, intended to add the content of the said predicted input image to the prediction error weighted by the said modified recursivity coefficient when the said input image is an image coded as intra type, and means of estimation of at least one noise level ($\sigma_{inf}$, $\sigma_{sup}$) as a function of at least the said quantities representative of motion-compensated image variations (DFD).

According to the invention, the said recursivity coefficient ($\alpha$) is calculated as a function of the said noise level ($\sigma_{inf}$, $\sigma_{sup}$) and of the said prediction error ($\epsilon$), the said coding device comprises: means of measurement of the intra-image correlation, means of measurement of the inter-image correlation (FD), and means of selection of a type of coding applied to the said current input image as a function of at least the measurements performed by the means of measurement of the inter-image correlation and the means of measurement of the intra-image correlation and as a function of the said estimated noise level ($\sigma_{inf}$, $\sigma_{sup}$), and the means of filtering and the coder of a motion-compensated image are dependent on the said type of coding selected by the said means of selection.

The calculation of the recursivity coefficient a as a function of the estimated noise level improves the effectiveness of the filter for given noise. Advantageously, the device calculates at least two noise levels $\sigma_{inf}$ and $\sigma_{sup}$. Preferably, when the prediction error is greater than the upper bound $\sigma_{sup}$, the recursivity coefficient $\alpha$ then equals "0" and when the prediction error is less than the bound $\sigma_{inf}$, $\alpha$ equals "0.9".

Such a device improves the performance of the recursive filtering for a coding using images of bi-directional type. Specifically, the use of bi-directional images has the indirect effect of distancing the I or P images from one another, this generally resulting in an increase in the prediction error. Moreover, the distancing of the I or P images from one another reduces the performance of the recursivity of the filter, in particular as regards the speed of convergence of the filter.

Preferably, the recursivity coefficient is calculated for each pixel of the input image.

Thus, the calculation of the recursivity coefficient is sharpened and the blurring effects related to the homogenization of this coefficient carried out in systems based on blocks are avoided.

In a particularly advantageous mode of implementation, the coding device comprises means of detection of change of scene.

This makes it possible to improve the coding of the images by choosing the type of coding applied to the current image as a function also of the detection of a change of scene.

Preferably the said recursivity coefficient ($\alpha$) takes a zero value for the first image following the change of scene when the means of detection of change of scene detect a change of scene.

Advantageously, the said means of selection of a type of coding select the type of coding applied to the said current input image as a function of information received from the said change of scene detector.

Preferably, the means of selection of the type of coding of the image adjust the sequencing of the types of coding and the choice of the number of successive bi-directional images.

According to a particular mode of implementation, the first image following a detection of change of scene is coded as intra type and the following image is coded as predictive type.

In the presence of a change of scene, the choice of a coding as Intra type of the first image following this change of scene improves the performance of the coding. Within the framework of the invention, this forcing of the first image of the new sequence to an Intra type is additionally accompanied by a resetting of the filtering block to zero (forcing $\alpha=0$ in the intra image of the new sequence). This resetting to zero is controlled by an RTZ signal sent to the video coder.

In a particular mode of implementation the spacing (GOPM) between two successive images of intra or predictive type is calculated according to the formula:

$$GOPM = \text{Max}[GOPM_{default} - nint[\beta^* \text{max}\{(FD_d - LD_d)/LD_d, 0\}], 1],$$

where:

$\beta$ is preferably equal to "1" and "nint" represents the nearest integer, $FD_d = \text{Max}(1, FD - \sigma_{inf})$, $LD_d = \text{Max}(1, LD - \sigma_{inf})$, $GOPM_{default}$ represents the maximum value permitted by the coding device, Max representing the maximum function, FD representing the inter-frame correlation measurement and LD representing the intra-frame correlation measurement.

In this mode of implementation, the means of selection of the type of image, when they are in the presence of a new scene of images, start with an image of intra type followed directly by an image of Predicted type. This choice makes it possible to obtain the greatest speed of convergence of the recursive filter integrated into the coder. Subsequently, the selector of image type determines the appropriate choice of the spacing between I or P images to be used as a function of the spatio-temporal correlation measurements corrected by the measurement of the lower bound of the noise level. This results in an optimised choice of the joint performance of the coder and of the recursive filter.

The invention also relates to a process for coding video images by motion compensation in which at least one input image is stored, motion vectors (D(dx, dy)) and quantities representative of motion-compensated image variations (DFD) are produced on the basis of a current input image and of at least the said input image stored previously in the said means of storage, a motion-compensated image is calculated on the basis of a filtered image and of the said motion vectors (D(dx, dy)), a prediction error ($\epsilon$) between the said current input image and the said filtered image predicted by motion compensation is calculated, a recursivity coefficient ($\alpha$) is calculated, a weighting of the said prediction error by a modified recursivity coefficient ($1-\alpha$) is produced, the content of the said predicted input image is added to the prediction error weighted by the said modified recursivity coefficient when the said input image is an image coded as intra type, at least one noise level ($\sigma_{inf}$, $\sigma_{sup}$) is estimated as a function of at least the said quantities representative of motion-compensated image variations (DFD), characterized in that the said recursivity coefficient ($\alpha$) is calculated as a function of the said estimated noise level ($\sigma_{inf}$, $\sigma_{sup}$) and of the said prediction error ($\epsilon$), the intra-image correlation is measured, the inter-image correlation is measured, a type of coding applied to the said current input image is selected as a function of at least the measurements of the inter-image correlation and of the measurements of the intra-image correlation and as a function of the said estimated noise level ($\sigma_{inf}$, $\sigma_{sup}$), the said current input image is coded as a function of the said type of coding selected.

BRIEF DESCRIPTION OF THE DRAWINGS

The invention will be better understood and illustrated by means of examples of advantageous modes of implementation and embodiments, which are in no way limiting, with reference to the appended figures in which.

DETAILED DESCRIPTION OF THE INVENTION

Figure 1:
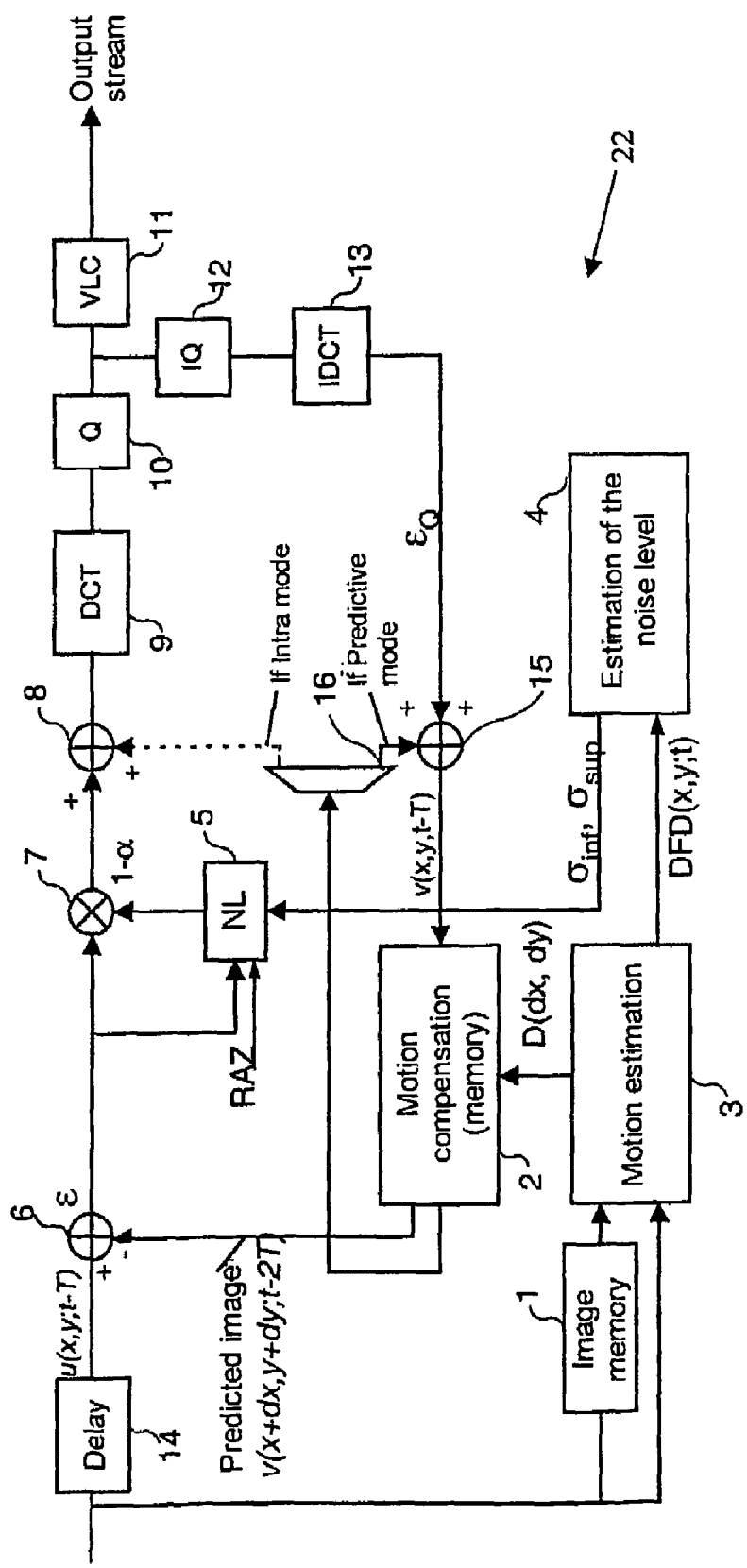
FIG. 1 represents a schematic diagram of a coder based on motion compensation incorporated into the device of FIG. 4.

FIG. 1 represents the principle of a motion compensation coder 22 incorporating a recursive filtering device.

The following notation is used:

x, y and t respectively denote the abscissa, ordinate and time, u(x,y;t): denotes a current input signal, u(x,y;t−T): denotes an input signal retarded by a delay T (T represents a delay of one video frame for example), D(dx,dy): denotes a displacement vector, dx designating the offset (shift) in displacement along the abscissa axis and dy the offset in displacement along the ordinate axis, v(x,y;t) denotes the output of the filter, v(x+dx,y+dy;t−T) denotes the motion-compensated output from the filter, retarded by a delay T, $\alpha$: denotes the recursivity coefficient for the current sample, $\sigma_{inf}$: denotes the lower limit of an estimated noise level for the whole image, $\sigma_{sup}$: denotes the upper limit of an estimated noise level for the whole image, NL: denotes a non-linear function $\alpha=f(\epsilon,\sigma_{inf},\sigma_{sup})$ DFD(x,y;t): denotes DFD(x,y;t)=u(x,y;t)−u(x+dx,y+dy;t−T) applied to a pixel or to a block of pixels.

The coder 22 comprises a memory 1, designed to store an input image (signal u(x,y;t)) and a block wise motion estimator 3, designed to produce, block wise, motion vectors D(dx,dy) and DFDs, on the basis of a current input image (signal u(x,y;t)) and of an input image stored previously (signal u(x,y;t−T)) in the memory 1.

A delay module 14 delays the input signal u(x,y;t) by a video frame period and therefore produces at output a signal u(x,y;t−T). The delay module 14 makes it possible to obtain statistics of DFD in phase with the image to be filtered.

The coding device furthermore comprises a motion compensation module 2 whose output is steered to a multiplexer 16 and to an adder 6.

Figure 4:
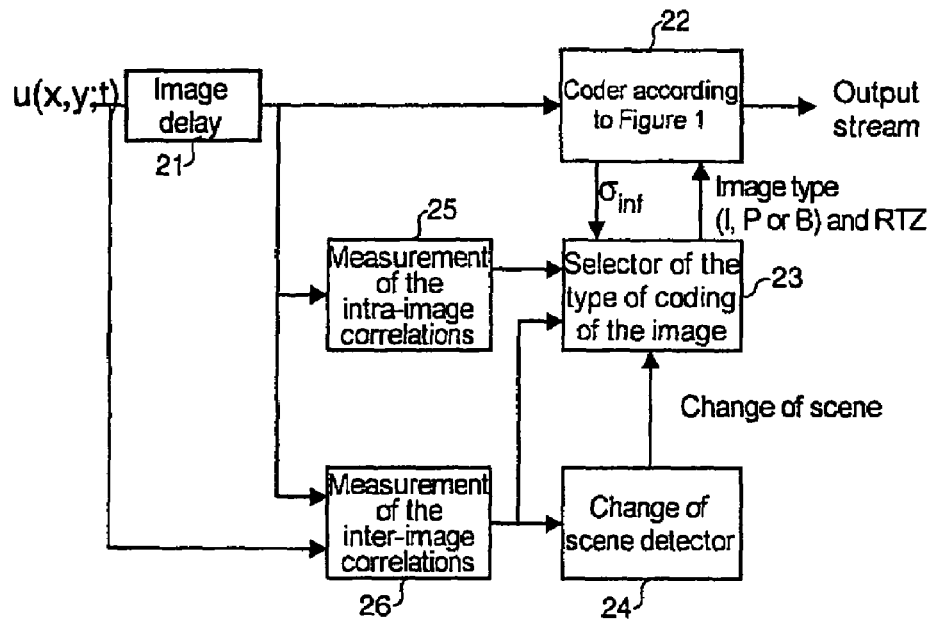
FIG. 4 represents a device according to the invention.

The multiplexer 16 steers the signal v(x+dx,y+dy;t−T) output by the motion compensator 2 to an adder 8 whose output is linked to the input of a DCT coding module 9 or to an adder 15 whose output is linked to the input of the motion compensator 2. The control of the multiplexer is carried out by choosing the type of images to be coded. This control is generated by a selector of the type of the image 23 (FIG. 4). If the intra coding type is selected, then the output of the multiplexer is connected to the adder 18. Otherwise, if the predictive type is selected, the output of the multiplexer is connected to the input of the adder 15.

Figure 3:
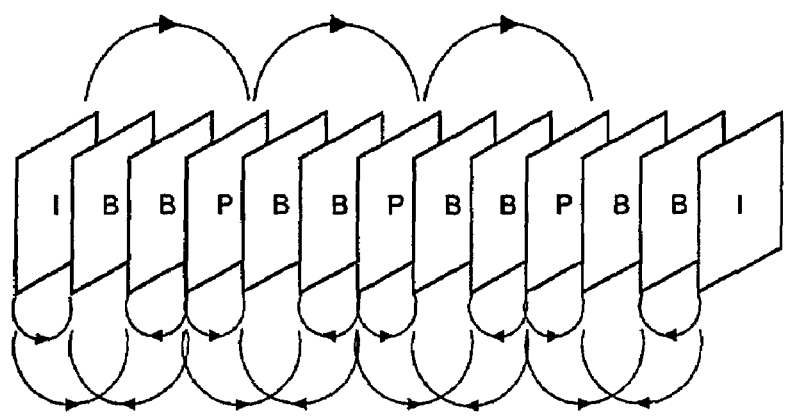
FIG. 3 represents the sequencing of the images coded according to the MPEG-2 standard.
Figure 5:
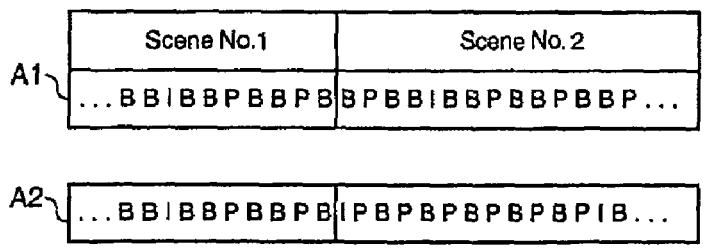
FIG. 5 represents the modifications made to the sequencing of the images according to the invention.

The MEPG-2 standard provides for three types of coding of the images and the sequencing of these images is represented in FIGS. 3 and 5. The first type, indispensable for starting the operation of coding a sequence, is the intra type denoted I. In this type, the coder ignores the predicted image by emptying the memory used by the motion compensation block. The prediction error then becomes the image to be coded and no motion vector is associated with this coded image.

The second type of coding of the images relies on differential coding. The coder having stored the image previously coded and motion compensated, called the predicted image, the prediction error constitutes in this case the difference between the actual image and the predicted image. This difference then undergoes the same processing as the image coded in the Intra type and the inverse quantization and inverse DCT operations make it possible to accumulate the result of the quantized prediction error with the predicted image. The images coded by simple prediction (also known as forward prediction) are called the predictive images and denoted P. These images use either the Intra image or the temporally earlier predictive image as predicted image.

The last type of coding possible is the Bi-directional type for which an image can use two predicted images for constructing the prediction error. This doubling of possibility of motion compensation makes it a more effective coding process than the Predictive type. By design, a Bi-directional image, denoted B, is based on the two Intra or Predictive images which flank it temporally. This signifies that the coding in this type requires that the temporal structure of presentation of the images be disarranged since the decoder, in order to decode a Bi-directional image, must have the Intra or temporally posterior Predictive image. In this case, the decoder uses a memory to rearrange the images in their order of presentation. This type of coding is not represented in FIG. 1.

An important characteristic of the Bi-directional images is that they do not enter the memory of the motion compensation block 2 on account of the fact that they are never used in the construction of the predicted images (role played solely by the Intra and Predictive images). Therefore, only the Intra and Predictive images are necessary in their local decoded form in the coding procedure. The motion estimation block 3, in the case of B images, searches for the 5 candidate vector (that which minimizes the quadratic error) in relation to the last two images coded in the Intra or Predictive types.

The adder 6 is capable of subtracting the current input image (signal u(x+, y+;t−T)) and an image predicted previously by motion compensation (signal v(x+dx, y+dy;t−2T)) from a filtered image. The adder 6 thus produces a prediction error $\epsilon$.

The coder 22 is also provided with a unit 4 for determining noise levels $\sigma_{inf}$ and $\sigma_{sup}$ as a function of the DFDs. The noise levels $\sigma_{inf}$ and $\sigma_{sup}$ are used to calculate a recursivity coefficient $\alpha$.

A module 5 for calculating the recursivity coefficient $\alpha$ is intended to receive from the unit 4 the noise levels $\sigma_{inf}$ and $\sigma_{sup}$ and from the adder 6, the prediction error $\epsilon$, and to calculate via a non-linear filter function (NL) the recursivity coefficient $\alpha$. The limits of the estimated noise level $\sigma_{inf}$ and $\sigma_{sup}$ are obtained from the values of the DFDs. Preferably, the limits of the noise level are deduced from a statistical analysis of the DFDs calculated for the image by defining two thresholds on a histogram representation.

In a particular type of implementation, it is for example possible for $\sigma_{inf}$ to be taken as the value of the DFD for which the histogram of the DFDs reaches 5% of the image population and for $\sigma_{sup}$ to be taken as the value of the DFD for which the histogram of the DFDs reaches 95% of the image population. The value $\sigma_{sup}$ nevertheless remains bounded to a maximum of 4 times the value $\sigma_{inf}$ so as to avoid corrupting the estimation of the noise level with the prediction and quantization errors introduced by the coder.

A multiplier 7 makes it possible to multiply the prediction error $\epsilon$ output from the adder 6 by (1−$\alpha$), value received from the calculation module 5. Moreover, a second adder 8 is intended to receive the result of this product from the multiplier 7 and to add it to the image predicted previously by motion compensation (signal v(x+dx, y+dy;t−2T)) from a filtered image when the image is coded as intra type.

When the image u(x,y;t−T) is intended for coding as intra type, it is in fact necessary to add the predicted image to the prediction error $\epsilon$ so that the decoder can decode an image coded as intra type.

The coding by motion compensation is generally combined with a coding by entropy reduction whose role is to render the coding bit rate fixed over time. This makes it possible in particular to slave the coding process to the bit rate imposed by a channel for transmitting the coded stream. Among the approaches commonly encountered, coding by quantization in the DCT domain (the acronym standing for "Discrete Cosinus Transform") is the most widespread and is adopted here by way of non-limiting illustration.

The device therefore furthermore comprises the DCT coding module 9 which performs a discrete cosine transformation of the prediction error $\epsilon$. The signal thus transformed undergoes quantization by a quantization module 10 so as to reduce its bit rate.

The last stage before generating the stream is a VLC entropy coding stage 11 (the acronym standing for "Variable Length Coding") whose role is to further reduce the bit rate by expressing via short codes the binary sequences whose probability of appearance is highest. It receives as input the signal emanating from the quantization module 10. The VLC module 11 also implements the coding of the displacement vectors emanating from the motion estimation block according to the same principle.

The device also comprises a module 12 implementing the operation inverse to that of the module 10, i.e. an inverse quantization operation IQ. This module 12 is connected to a module 13 which implements the operation inverse to that of the module 9, i.e. an inverse discrete cosine transformation IDCT. These modules provide the previous local decoded image which corresponds to the image reconstructed by the decoder. The prediction error $\epsilon$ then constitutes the discrepancy between the image to be coded and the image predicted by the decoder by motion compensation.

Ignoring the degradations introduced by the quantizer 10 and the inverse quantizer 12, we therefore have at the output of the adder 15:

$$v(x, y;t-T)=(1-\alpha)x\ u(x, y;t-T)+\alpha x\ v(x+dx,y+dy;t-2T)) \quad \text{Eq (1)}$$

Figure 2:
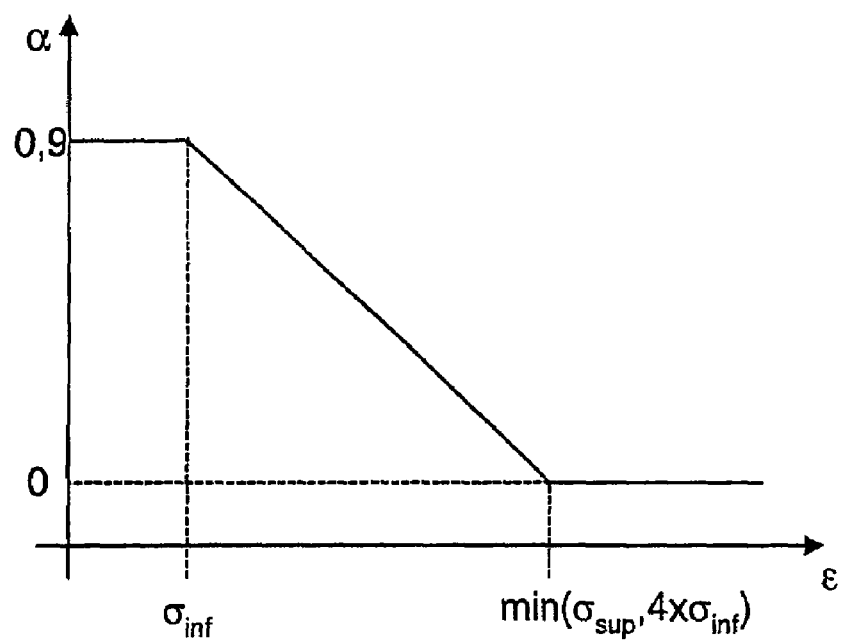
FIG. 2 represents the evolution of the recursivity coefficient $\alpha$ as a function of the prediction error $\epsilon$.

Equation (1) above is updated with each pixel u(x,y;t−T) of the incoming image as a function of the limits of the noise level estimated in the image and of the prediction error $\epsilon$. This updating is achieved by altering the recursivity coefficient $\alpha$ at the output of the calculation module 5. This module implements the transformation function (FIG. 2):

$$\alpha=f(\epsilon,\sigma_{inf},\sigma_{sup}).$$

This function causes the recursivity coefficient $\alpha$ to tend to 0.9 as the prediction error $\epsilon$ decreases to the lower limit of the estimated noise, the error is then regarded entirely as noise. Conversely, $\alpha$ tends to 0 as the prediction error increases to the upper limit of the estimated noise: beyond this limit, the error is then regarded entirely as useful signal.

The output of the module 13 is linked to the adder 15 which adds the signal produced by the IDCT module 13 and the predicted image v(x+dx,y+dy;t−2T) when the type of coding selected is the predictive type. The output of the adder 15 is injected into the motion compensation module 2. At the output of the module 15, the signal v(x,y;t−T) is also the signal at the output of a decoder which would decode the output stream.

In the case of coding according to the MPEG-2 standard, the performance level of the recursive filter is dependent on the choice of sequencing of the type of coding of the images. Specifically, the images predicted by motion compensation are deduced from the local decoded images which are coded only in the intra or predictive types.

The presence of images coded as bi-directional type causes the mutual distancing of the intra and predictive images, thereby potentially decreasing the quality of the predicted images when the motions are complex.

More precisely, the error signal $\epsilon$ obtained at the output of the adder 6 can be broken down into three components:

$$\epsilon=\epsilon_{pred}+\epsilon_{noise}+\epsilon_{quant}$$

$\epsilon_{pred}$ represents the prediction error induced by the motion compensation, for example during rotation or deformation.

$\epsilon_{noise}$ represents the random noise component of the video signal.

$\epsilon_{quant}$ represents the quantization noise component induced by the coder itself, in the course of the quantization (Q) and dequantization (IQ) operations.

The unit 4 for estimating the noise level has the role of estimating the noise level $\epsilon_{noise}$. It receives as input the DFDs obtained by the motion estimator 3, and carries out a statistical analysis of the DFDs which it receives as input. The noise level generally being homogeneous in an image, the estimation of the noise level is then obtained by thresholding the histogram of the DFDs.

The smaller the components $\epsilon_{pred}$ and $\epsilon_{quant}$ relative to the component $\epsilon_{noise}$, the more effective is the noise reduction.

The mutual distancing of images coded as intra or predictive type has the effect of increasing the prediction error $\epsilon_{pred}$ thereby tending to reduce the action of the filter which identifies this error as useful signal. Moreover, the recursive nature of the filtering process induces a phenomenon of convergence over a duration which is all the larger the bigger the distancing between intra or predictive images.

Preferably, the noise level induced by the quantization process $\epsilon_{quant}$ is disregarded in the estimation of the noise level.

A coding device according to the invention (FIG. 4) comprises a coder 22 in accordance with that of FIG. 1. It receives as input the signal u(x,y;t) to be coded. The latter enters a delay module 21 where it is delayed by a video frame period T. The output of the delay module 21 is linked to the coder 22, to a module 25 for measuring the intra-image correlation and to a module 26 for measuring the inter-image correlation.

The measurement of inter-image correlation, also called the temporal correlation FD (the acronym standing for "Frame Difference"), between two successive images can be obtained through the image wise average of the values:

FD(x,y;t)=u(x,y;t)−u(x,y;t−T), T representing the time delay applied to the image u(x,y;t).

The measurement of intra-image correlation, also called the spatial correlation, LD (the acronym standing for "Line Difference") can be obtained through the image wise average of the values:

LD(x,y;t)=u(x,y;t)−u(x,y+1;t), y and y+1 representing two indices of adjacent lines.

The selector 23 of the type of coding of the image receives as input the measurements made by the modules 25 and 26, and the lower bound of the noise level $\sigma_{inf}$ estimated by the video coder 22.

In a preferred type of implementation, the selector of image type 23 also receives a change of scene cue delivered by a change of scene detector 24.

The change of scene detector 24 measures the breaks in continuity of the inter-frame correlations according to known processes. Thus the detector 24 identifies the position of the images corresponding to a change of shot, in the case for example of editing or of filming. The process of deciding the type of image to be coded on the basis of the change of scene cues is detailed in FIGS. 6 to 8.

On the basis of the data which it receives as input, the selector 23 sends the coder 22 the choice of the type of coding image appropriate to the content of the video sequence as well as an order for resetting the filter to zero ($\alpha=0$).

An example of the modifications made to the type of coding of the images by the selector 23 upon a change of scene is detailed herein below, with reference to FIG. 5.

The represented arrangement of the images is a temporal arrangement, such as displayed by a decoder, for two successive scenes "scene 1" and "scene 2".

Stream A1 is the stream obtained by using the default values which are:

$GOPN_{default}=12$ $GOPM_{default}=3$.

The value GOPN represents the spacing between two successive intra images, i.e. 12 in the example proposed. The value GOPM represents the spacing between two successive I or P images, i.e. 3 in the example proposed.

Stream A2 is an example of a stream obtained at the output of the coder 22 by way of the selector of type of coding of the image 23.

The first image of scene 2 is coded according to the intra type (I) and no longer according to the bi-directional type (B) as in stream A1. The second image of scene 2 is coded using the predictive type (P) and not the bi-directional type B as is the case in the default coding.

Moreover, the value of GOPM is reduced to 2 so as to improve the convergence of the filter.

The manner of operation of a type of implementation of the selector 23 making it possible to generate the stream A2 represented in FIG. 5 is set forth herein below, with reference to the flowchart of FIG. 6.

When a new image is received at the input of the coder 22 (signal u(x,y;t)) (step E1), the detector 24 detects a change of scene with the aid of the inter-image correlation measurements supplied by the module 26. The selector 23 also receives the value of the noise level Self from the coder 22 as well as the LD intra-image correlation measurements and the FD inter-image correlation measurements supplied respectively by the modules 25 and 26.

On the basis of these measurements, the selector 23 calculates a value of GOPM as a function of the default GOPM value, of the FD and LD measurements and of $\sigma_{inf}$ so as to:

1 check correct convergence of the filtering at each new scene of images and 2 check the small proportion of the errors induced by the coding process with respect to the noise level contained in the video signal.

To answer these two points, a first step consists in forcing a coding as predictive type of the image which temporally follows the first image of a change of scene. Moreover, it is judicious to choose a spacing between I or P images so as to decrease the errors induced by the coding process.

The default spacing between two successive I or P images conditions the rate of convergence of the recursive filter integrated into the coder. It is therefore important to accelerate the convergence of the filter by reducing the spacing between the I or P images just after a change of scene. According to a particularly advantageous mode of implementation, the value of this spacing adapted to the intra- and inter-image correlation measurements carried out upstream of the coder as well as of the noise level lower bound estimated by the coder.

This consists initially in carrying out a noise correction on the measurements of the FDs and of the LDs. The FD and LD measurements, in the presence of random noise, are corrupted by the mean value of this noise. These values should therefore be corrected by the value of the noise $\sigma_{inf}$ estimated by the coder.

$$FD_d=\max(1, FD-\sigma_{inf})$$

$$LD_d=\max(1, LD-\sigma_{inf})$$

Subsequently, this consists in calculating the value of GOPM. We take for example:

$$GOPM=GOPM_{default}-nint[\beta^*\max\{(FD_d-LD_d)/LD_d, 0\}].$$

In the case of an MPEG coder, the value of GOPM is bounded. We therefore perform a thresholding of the value of GOPM obtained according to the following formula:

$$GOPM=\max\{GOPM,1\}$$

The value $GOPM_{default}$ is the absolute maximum value permitted by the MPEG coder as the function of the storage capacities used for the rearrangement.

The parameter β allows greater or lesser accentuation of the adaptation of the GOPM value to the content of the video images. Thus, the more β tends to the value "0", the less adaptation there is, the value GOPM then taking essentially the value $GOPM_{default}$. Preferably, β is given the value "1".

When a change of scene is detected, step E2, we go to a step E3, in which the selector 23 sets the counters $GOPN_{index}$ and $GOPM_{index}$, Scenecutflag and RTZ to the value "1".

Figure 8:
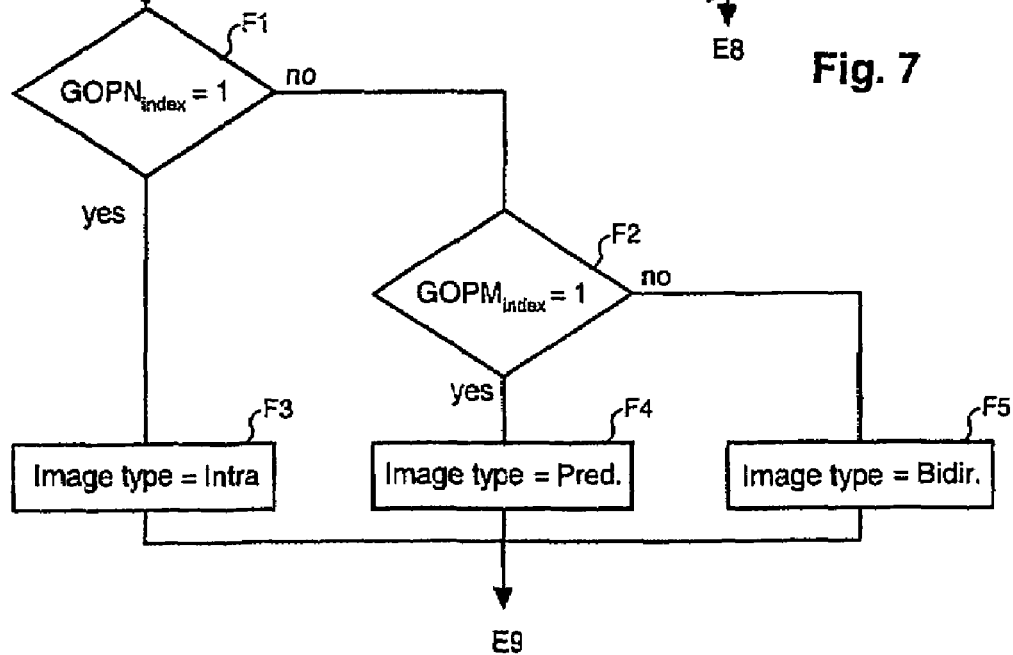
FIG. 8 represents the steps of the calculation of the image type on the basis of the indices $GOPM_{index}$ and $GOPN_{index}$ deployed in an image type selector represented in FIG. 4.

Next, we go to a step E8 and the image type is calculated according to steps F1 to F5 described later (FIG. 8).

When the type of image is determined, it is sent to the coder 22, step E9, as is the RTZ signal. The RTZ signal is a command for the filtering device to force the recursivity coefficient α to the value "0". When α equals "0", the prediction error ε is not weighted, so as to avoid a recursive averaging between images belonging to different shots.

When no change of scene is detected, step E2, we go to a step E4 for testing the Scenecutflag signal. The Scenecutflag signal makes it possible to ascertain whether the previous image is a start of scene image or otherwise. If the value of this signal is equal to "1", we then go to a step E7, in the course of which the counter $GOPN_{index}$ is incremented by "1", the value "1" is allocated to the counter $GOPM_{index}$ and the value "0" is allocated to the SceneCutFlag and RTZ signals. We next go to step E8 described previously.

Figure 7:
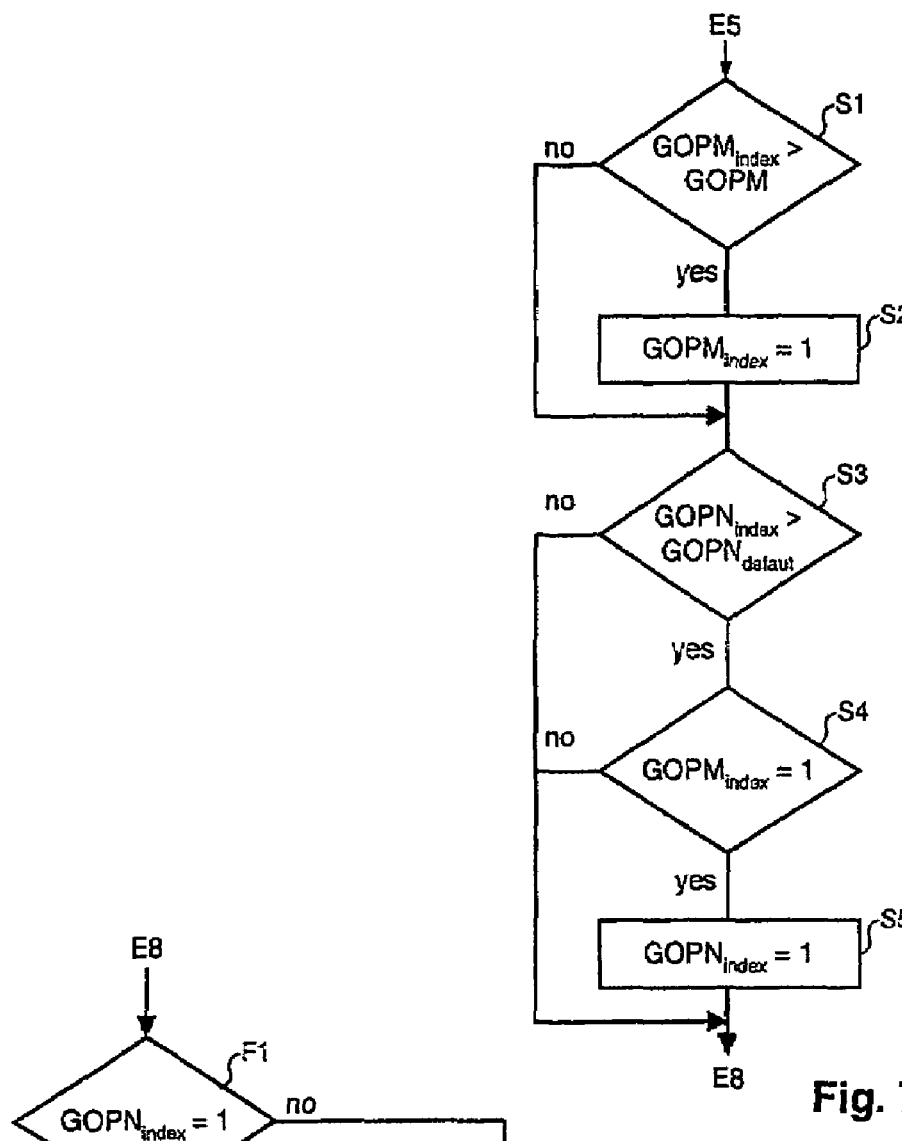
FIG. 7 represents the steps of reinitializing the counters $GOPM_{index}$ and $GOPN_{index}$ deployed in an image type selector represented in FIG. 4.

In the course of step E4, if the SceneCutFlag signal does not equal "1", we go to a step E5 and the counters $GOPM_{index}$ and $GOPN_{index}$ are incremented by "1". Next, we go to a step E6 in which the counters $GOPM_{index}$ and $GOPN_{index}$ are updated as a function of the signals $GOPN_{default}$ and GOPM according to steps S1 to S5 described herein below (FIG. 7).

Figure 6:
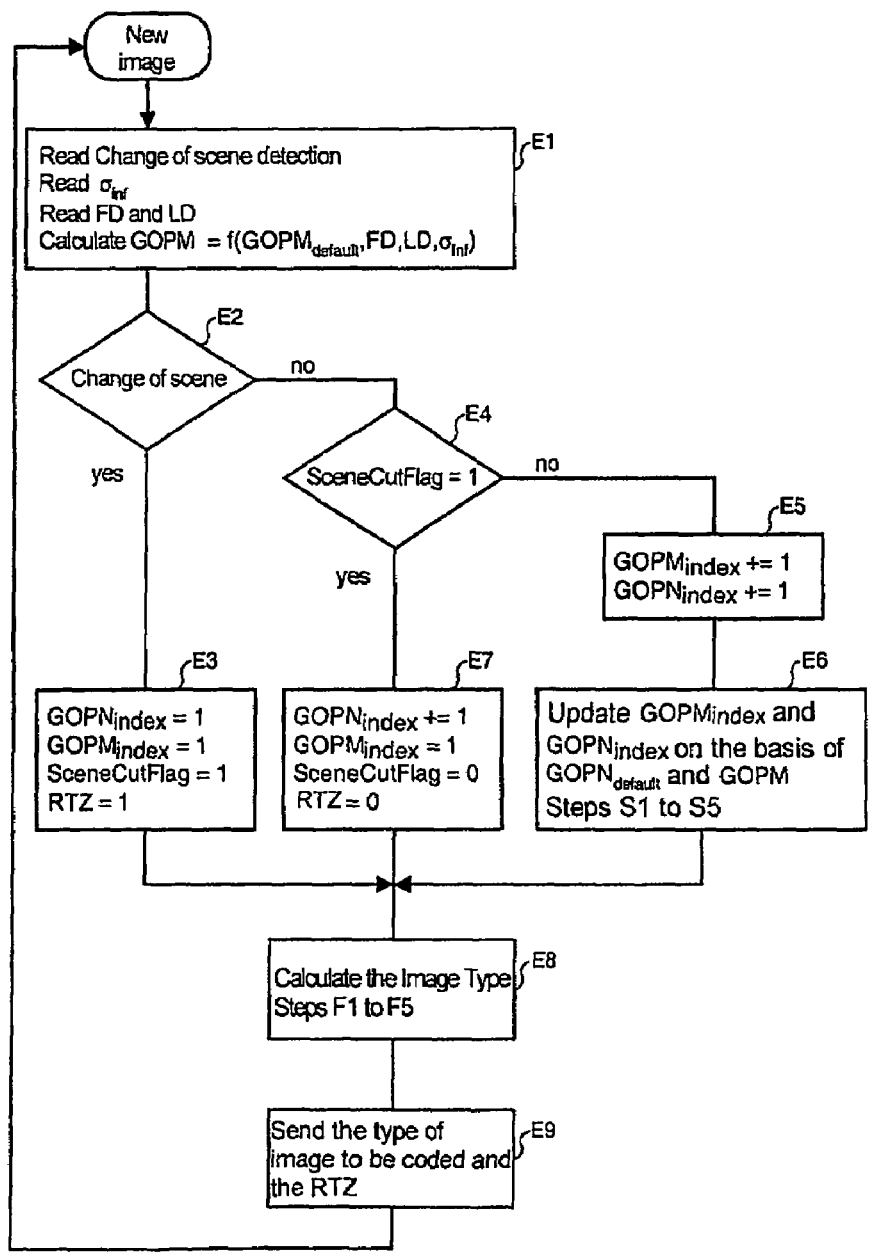
FIG. 6 represents a flowchart of the operation of a mode of implementation of the type of image coding selector represented in FIG. 4.

We now consider (FIG. 7) the steps S1 to S5 for reinitializing the signals $GOPN_{index}$ and $GOPM_{index}$, which are performed during step E6 (FIG. 6).

When the value of the counter $GOPM_{index}$ is greater than the value of the signal GOPM (test of step S1), the value "1" is assigned to the counter $GOPM_{index}$ (step S2), then we go to step S3. Otherwise, when the value $GOPM_{index}$ is less than or equal to the value of GOPM, we go directly to step S3. We next test whether the value of $GOPN_{index}$ is greater than the value $GOPN_{default}$ (step S3). If it is greater we then test whether the value of $GOPM_{index}$ is equal to "1" (step S4). If it is, we then assign the value "1" to $GOPN_{index}$ (step S5), otherwise, the value of $GOPN_{index}$ is not modified.

The calculation of the image type on the basis of the indices $GOPM_{index}$ and $GOPN_{index}$ is performed in the following manner (FIG. 8).

When $GOPN_{index}$ equals "1" (test of step F1), the image type selected is the intra type (step F3). When $GOPN_{index}$ does not equal "1", a test is carried out on the value of $GOPM_{index}$ (step F2). If $GOPM_{index}$ equals "1", then the image type selected is a predicted image (step F4). If the value of $GOPM_{index}$ is not equal to "1", then the image type selected is a bi-directional image (step F5).

The invention claimed is:

1. Device for coding video images by motion compensation comprising a coder comprising:
   means of storage of at least one input image,
   motion estimation means, designed to produce motion vectors and quantities representative of motion-compensated image variations, on the basis of a current input image and of at least said input image stored previously in said means of storage,
   means of calculation of a motion-compensated image on the basis of a filtered image and of said motion vectors,
   means of calculation of a prediction error, between said current input image and said motion-compensated image,
   means of calculation of a recursivity coefficient,
   first means of filtering, intended to produce a weighting of said prediction error by a modified recursivity coefficient,
   second means of filtering, intended to add the content of said motion-compensated image to the prediction error weighted by said modified recursivity coefficient when said input image is an image coded as intra type, and
   means of estimation of at least one noise level as a function of at least said quantities representative of motion-compensated image variations wherein:
   said recursivity coefficient is calculated as a function of said noise level and of said prediction error,
   said coding device comprises: means of measurement of the intra-image correlation,
   means of measurement of the inter-image correlation, and
   means of selection of an image coding type applied to said current input image as a function of at least the measurements performed by the means of measurement of the inter-image correlation and the means of measurement of the intra-image correlation and as a function of said estimated noise level,
   and the means of filtering and the coder of a motion-compensated image are dependent on said image coding type selected by said means of selection.

2. Device according to claim 1, wherein said recursivity coefficient is calculated for each pixel of said input image.

3. Device according to claim 1, wherein it comprises means of detection of change of scene.

4. Device according to claim 3, wherein said recursivity coefficient takes a zero value for the first image following the change of scene when the means of detection of change of scene detect a change of scene.

5. Device according to claim 3, wherein said means of selection of an image coding type select the image coding type applied to said current input image as a function of information received from said change of scene detector.

6. Device according to claim 1, wherein the images are coded as intra, predictive or bi-directional type and the means of selection of the image coding type adjust the sequencing of the image coding types and the choice of the number of successive bi-directional images.

7. Device according to claim 6, wherein the first image following a detection of change of scene is coded as intra type and the following image is coded as predictive type.

8. Device according to claim 6, wherein the spacing between two successive images of intra or predictive type is calculated according to the formula $$GOPM = \text{Max}[GOPM_{default} - \text{nint}[\beta^* \max\{(FD_d - LD_d)/LD_d, 0\}], 1],$$

where:
   β is preferably equal to "1" and "nint" represents the nearest integer,
   $FD_d = \text{Max}(1, FD - \sigma_{inf})$,
   $LD_d = \text{Max}(1, LD - \sigma_{inf})$,
   $GOPM_{default}$ represents the maximum value permitted by the coding device, Max representing the maximum function, FD representing the inter-frame correlation measurement and LD representing the intra-frame correlation measurement.

9. Process for coding video images by motion compensation in which
   at least one input image is stored,
   motion vectors and quantities representative of motion-compensated image variations are produced on the basis of a current input image and of at least said input image stored previously in said means of storage,
   a motion-compensated image is calculated on the basis of a filtered image and of said motion vectors,
   a prediction error between said current input image and said motion-compensated image is calculated,
   a recursivity coefficient is calculated,
   a weighting of said prediction error by a modified recursivity coefficient is produced,
   the content of said motion-compensated image is added to the prediction error weighted by said modified recursivity coefficient when said input image is an image coded as intra type,
   at least one noise level is estimated as a function of at least said quantities representative of motion-compensated image variations, wherein
   said recursivity coefficient is calculated as a function of said estimated noise level and of said prediction error,
   the intra-image correlation is measured,
   the inter-image correlation is measured,
   an image coding type applied to said current input image is selected as a function of at least the measurements of the inter-image correlation and of the measurements of the intra-image correlation and as a function of said estimated noise level,
   said current input image is coded as a function of said image coding type selected.

* * * * *